United States Patent
Murrow et al.

(10) Patent No.: US 7,707,815 B2
(45) Date of Patent: *May 4, 2010

(54) AXIAL FLOW POSITIVE DISPLACEMENT WORM GAS GENERATOR

(75) Inventors: Kurt David Murrow, West Chester, OH (US); Rollin George Giffin, Cincinnati, OH (US); Oladapo Fakunle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 993 days.

This patent is subject to a terminal disclaimer.

(21) Appl. No.: 11/313,146

(22) Filed: Dec. 19, 2005

(65) Prior Publication Data
US 2007/0137174 A1    Jun. 21, 2007

(51) Int. Cl.
*F02C 3/02* (2006.01)
(52) U.S. Cl. .................. 60/39.45; 60/226.1; 60/262; 418/48; 418/51
(58) Field of Classification Search ............. 60/226.1, 60/262, 39.45; 418/9, 48, 201.1, 202; 123/241, 123/249
See application file for complete search history.

(56) References Cited

U.S. PATENT DOCUMENTS

| | | | |
|---|---|---|---|
| 1,892,217 A | 12/1932 | Moineau | |
| 2,553,548 A | 5/1951 | Canazzi et al. | |
| 3,938,915 A | 2/1976 | Olofsson | |
| 4,482,305 A | 11/1984 | Natkai et al. | |
| 4,818,197 A | 4/1989 | Mueller | |
| 5,692,372 A | 12/1997 | Whurr | |
| 5,867,980 A * | 2/1999 | Bartos | 60/226.3 |
| 2004/0208740 A1* | 10/2004 | Hubbard | 415/72 |
| 2007/0264147 A1* | 11/2007 | Gorban et al. | 418/201.3 |

FOREIGN PATENT DOCUMENTS

| | | |
|---|---|---|
| FR | 787711 | 9/1935 |
| GB | 427475 | 4/1935 |
| SE | 89284 | 5/1937 |
| SU | 1567804 | 5/1990 |
| WO | WO9747886 | 12/1997 |

OTHER PUBLICATIONS

EP06255326, European Search Report, European Patent Office, Mar. 26, 2007.

* cited by examiner

*Primary Examiner*—Michael Cuff
*Assistant Examiner*—Phutthiwat Wongwian
(74) *Attorney, Agent, or Firm*—William Scott Andes; Steven J. Rosen

(57) ABSTRACT

An axial flow positive displacement engine has an inlet axially spaced apart and upstream from an outlet. Inner and outer bodies have offset inner and outer axes extend from the inlet to the outlet through first, second, and third sections of a core assembly in serial downstream flow relationship. At least one of the bodies is rotatable about its axis. The inner and outer bodies have intermeshed inner and outer helical blades wound about the inner and outer axes respectively. The inner and outer helical blades extend radially outwardly and inwardly respectively. The helical blades have first, second, and third twist slopes in the first, second, and third sections respectively. The first twist slopes are less than the second twist slopes and the third twist slopes are less than the second twist slopes. A combustor section extends axially downstream through at least a portion of the second section.

44 Claims, 10 Drawing Sheets

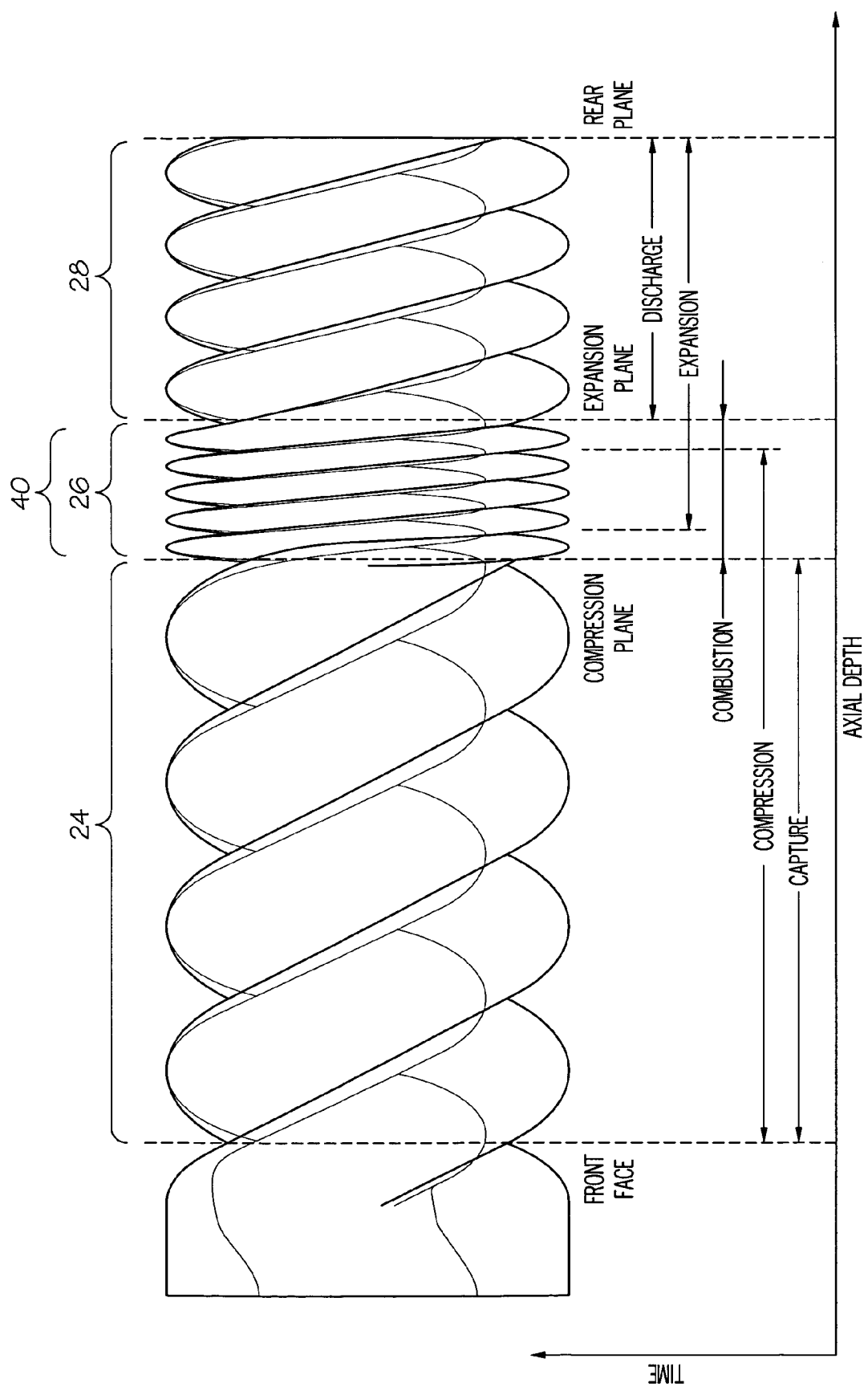

AXIAL FLOW POSITIVE DISPLACEMENT WORM GAS GENERATOR

The Government has rights to this invention pursuant to Contract No. NAS3-01135 awarded by the NASA.

BACKGROUND OF THE INVENTION

Field of the Invention

The present invention relates generally to turbomachinery and gas generators and, more particularly, to axial flow positive displacement gas generators and worm and screw compressors and turbines.

Gas generators are used in gas turbine engines such as in core engines for turbofan and other gas turbine engines having in downstream flow relationship a compressor section, a combustion section, and a turbine section. The function of the gas generator is to provide high energy fluid, which can in turn be harnessed to provide power for a variety of applications. Axial flow gas generators are particularly useful in many turbomachinery applications. Turbomachinery based gas generators are utilized in a wide range of applications owing in a great deal to a combination of desirable attributes such as high specific energy exhaust stream (energy per unit mass), high mass flow rate for a given frontal area, continuous, near steady fluid flow, reasonable thermal efficiency over a wide range of operating conditions. It is a goal of the gas turbine manufacturers to have light weight and highly efficient gas generators. It is another goal to have as few parts as possible in the gas generator to reduce the costs of manufacturing, installing, refurbishing, overhauling, and replacing the gas generator. Therefore, it is desirable to have a gas generator that improves all of these characteristics of gas generators.

BRIEF DESCRIPTION OF THE INVENTION

An axial flow positive displacement engine, such as a positive displacement axial flow gas generator, includes an inlet axially spaced apart and upstream from an outlet. Inner and outer bodies having offset inner and outer axes respectively extend from the inlet to the outlet. Either or both bodies may be rotatable. In one embodiment of the generator, the inner body is rotatable about the inner axis within the outer body. The outer body may be rotatably fixed or rotatable about the outer axis. The inner and outer bodies have intermeshed inner and outer helical blades wound about inner and outer axes respectively. The inner and outer helical blades extend radially outwardly and inwardly respectively.

The helical blades have first, second, and third twist slopes in the first, second, and third sections, respectively. A twist slope is defined as the amount of rotation of a cross-section of the helical element per unit distance along an axis. The first twist slopes are less than the second twist slopes and the third twist slopes are less than the second twist slopes. A combustion section extends axially downstream from the end of the first section through at least a portion of the second section. Constant volume combustion occurs in the second section.

The helical blades in the first section have sufficient number of turns to trap charges of air in the first section during the generator's operation. In one embodiment of the gas generator, the number of turns is enough to mechanically trap the charges of air. In another embodiment of the gas generator, the number of turns is enough to dynamically trap the charges of air.

BRIEF DESCRIPTION OF THE DRAWINGS

FIG. 11 is a diagrammatic cross-sectional view illustration of a positive displacement gas generator having the inner and outer bodies illustrated in FIG. 7.

DETAILED DESCRIPTION OF THE INVENTION

Figure 1:
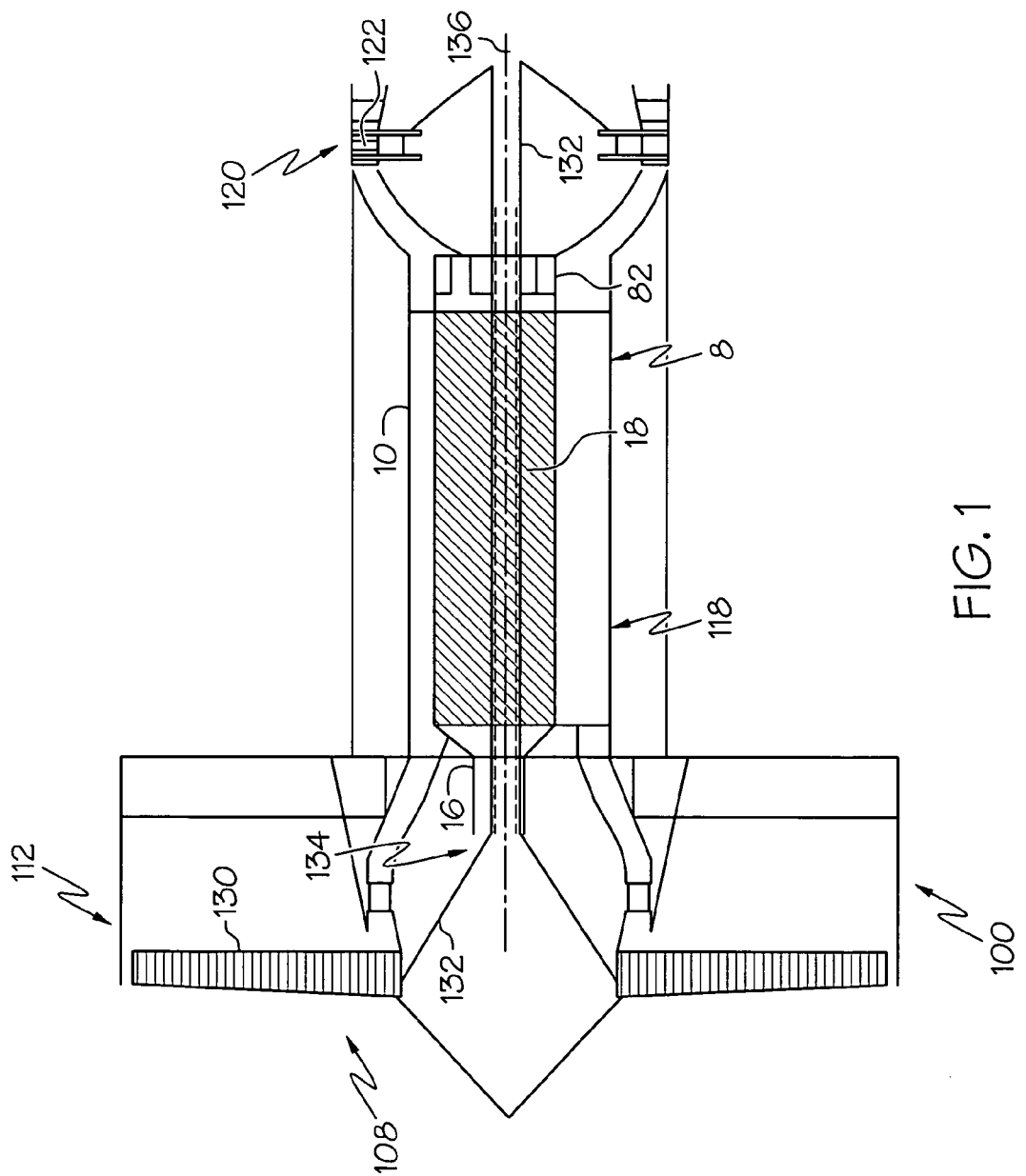
FIG. 1 is a cross-sectional view illustration of an exemplary aircraft gas turbine engine with a positive displacement axial flow gas generator.

Illustrated in FIG. 1 is an exemplary embodiment of an axial flow positive displacement worm engine 8 illustrated herein as a worm gas generator 10 in a gas turbine engine 100 application in which the gas generator 10 is used to power a turbine that produces work to drive a fan 108 in a fan section of the engine 100. The gas generator 10 may be used to directly drive power consuming devices such as marine propulsion drives and electrical power generators or aircraft nozzles or fans. The exemplary embodiment of the gas turbine engine 100 illustrated in FIG. 1 is an aircraft gas turbine engine having a core engine 118 including the gas generator 10 downstream of the fan section 112. Combustion gases are discharged from the gas generator 10 into a low pressure turbine (LPT) 120 having a row of low pressure turbine rotor blades 122. The low pressure turbine rotor blades 122 are drivingly attached to a row of circumferentially spaced apart fan rotor blades 130 of the fan 108 in the fan section 112 by a low pressure shaft 132 to form a low pressure spool 134 circumscribing an engine centerline 136. The gas generator 10 may be used in other applications including but not limited to ground based industrial and marine gas turbine engines.

Referring to FIGS. 2-5, the gas generator 10 includes a core assembly 15 having inner and outer bodies 12, 14 extending from an inlet 20 to an outlet 22. The inner body 12 is disposed within a cavity 19 of the outer body 14. The inner and outer bodies 12, 14 have inner and outer axes 16, 18 respectively. The core assembly 15 has first, second, and third sections 24, 26, 28 in serial downstream flow relationship. A combustion section 40 extends axially downstream through at least a portion of the second section. As illustrated herein the combustion section 40 extends axially downstream from the end of the first section 24 through the entire second section 26. The core assembly 15 has continuous flow through the inlet 20 and the outlet 22.

Individual charges of air 50 are captured in and by the first section 24. Compression of the charges 50 occurs as the charges 50 pass from the first section 24 to the second section 26. Thus, an entire charge 50 undergoes compression while it is in both the first and second sections 24 and 26, respectively. Combustion begins in the second section 26 after the entire charge 50 has passed out of the first section 24 into the second section 26 and the combustion in the second section 26 is constant volume combustion. The third section 28 is an expansion section and thus extracts energy from the combusted charges of air 50 to power the first and second sections 24, 26, respectively. Expansion of the charges 50 occurs as the charges 50 pass from the second section 26 to the third section 28. Thus, the entire charge 50 undergoes expansion while it is in both the second and third sections 26 and 28.

Either or both bodies may be rotatable and, if both bodies are rotatable, they rotate in the same circumferential direction clockwise or counterclockwise at different rotational speeds determined by a fixed relationship. If only one body is rotatable then the other body is fixed. In one embodiment of the generator, the inner body 12 is rotatable about the inner axis 16 within the outer body 14 and the outer body 14 may be rotatably fixed or rotatable about the outer axis 18.

The inner and outer bodies 12, 14 have intermeshed inner and outer helical elements wound about the inner and outer axes 16, 18, respectively. The elements are inner and outer helical blades 17 and 27 having inner and outer helical surfaces 21 and 23, respectively. The term worm is used because it commonly used to describe worm or screw compressors and is descriptive of the helical elements wound about the inner and outer axes 16, 18. The inner helical blades 17 extend radially outwardly from a hollow inner hub 51 of the inner body 12 and the outer helical blades 27 extend radially inwardly from an outer shell 53 of the outer body 14. An inner helical edge 47 along the inner helical blade 17 sealingly engages the outer helical surface 23 of the outer helical blade 27 as they rotate relative to each other. An outer helical edge 48 along the outer helical blade 27 sealingly engages the inner helical surface 21 of the inner helical blade 17 as they rotate relative to each other.

Figure 3:
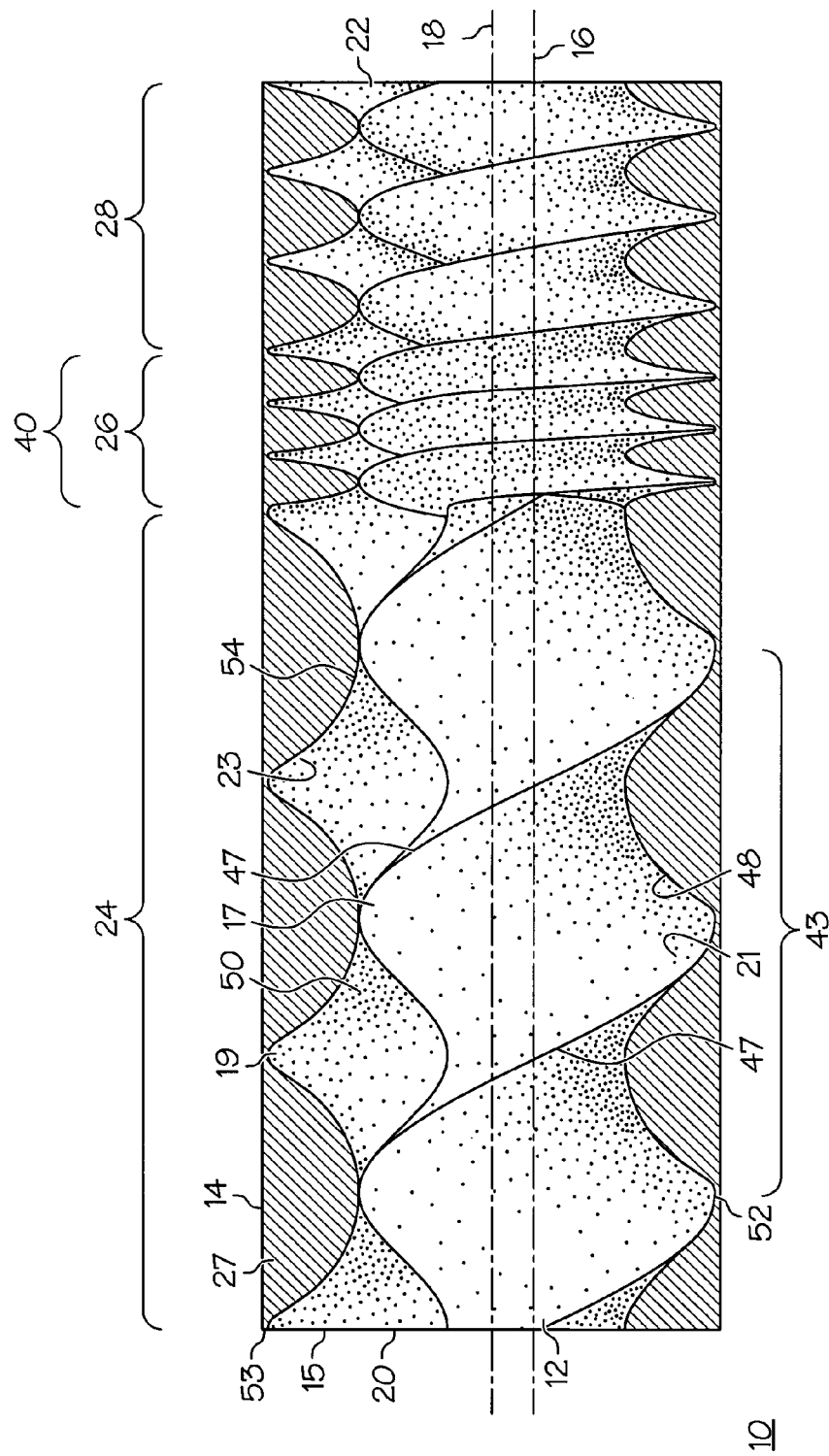
FIG. 3 is a diagrammatic partially cut away perspective view illustration of helical portions of inner and outer bodies of the gas generator illustrated in FIG. 2.
Figure 4:
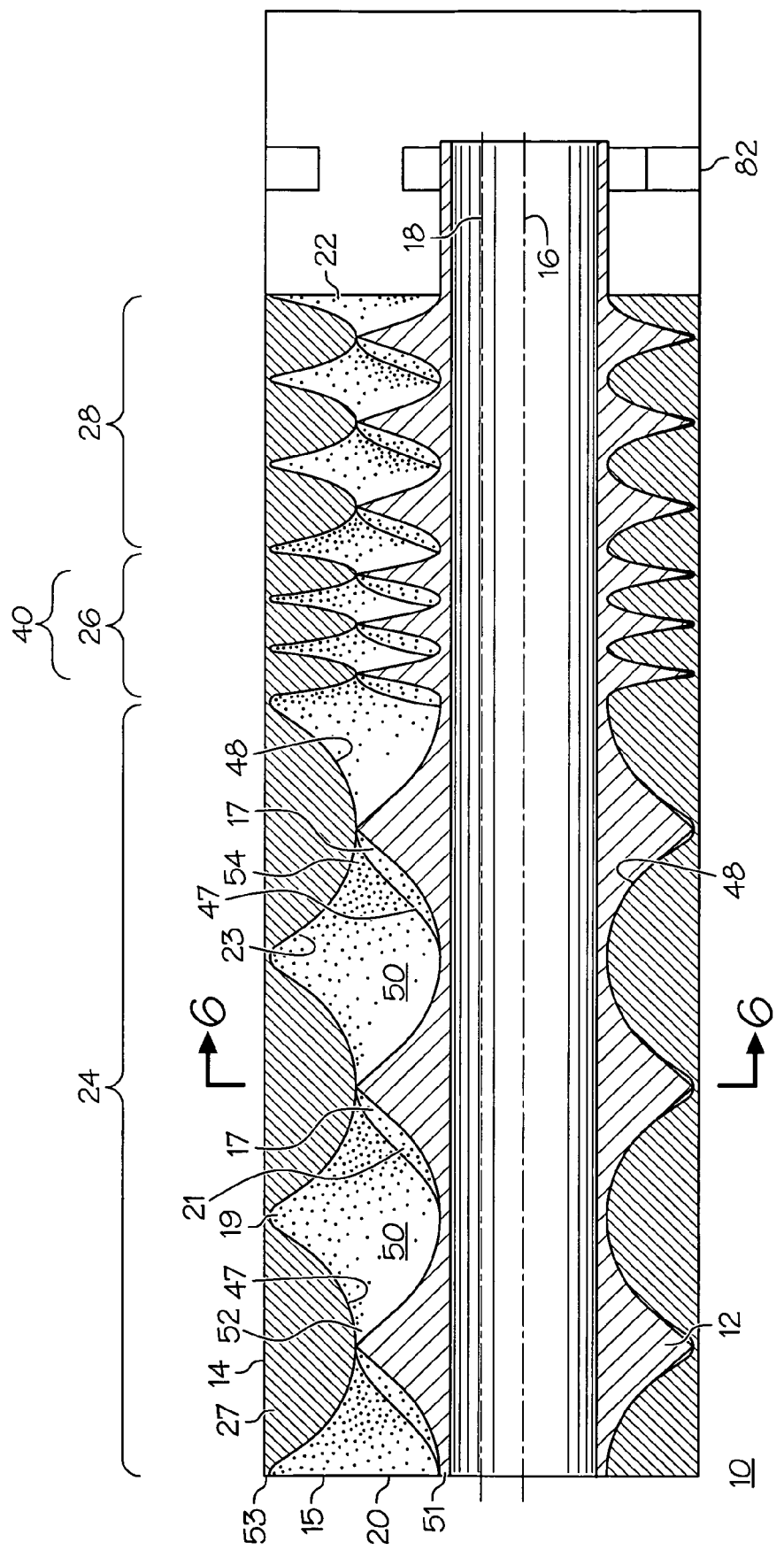
FIG. 4 is a diagrammatic cross-sectional view illustration of gearing between inner and outer bodies of the gas generator illustrated in FIG. 3.
Figure 6:
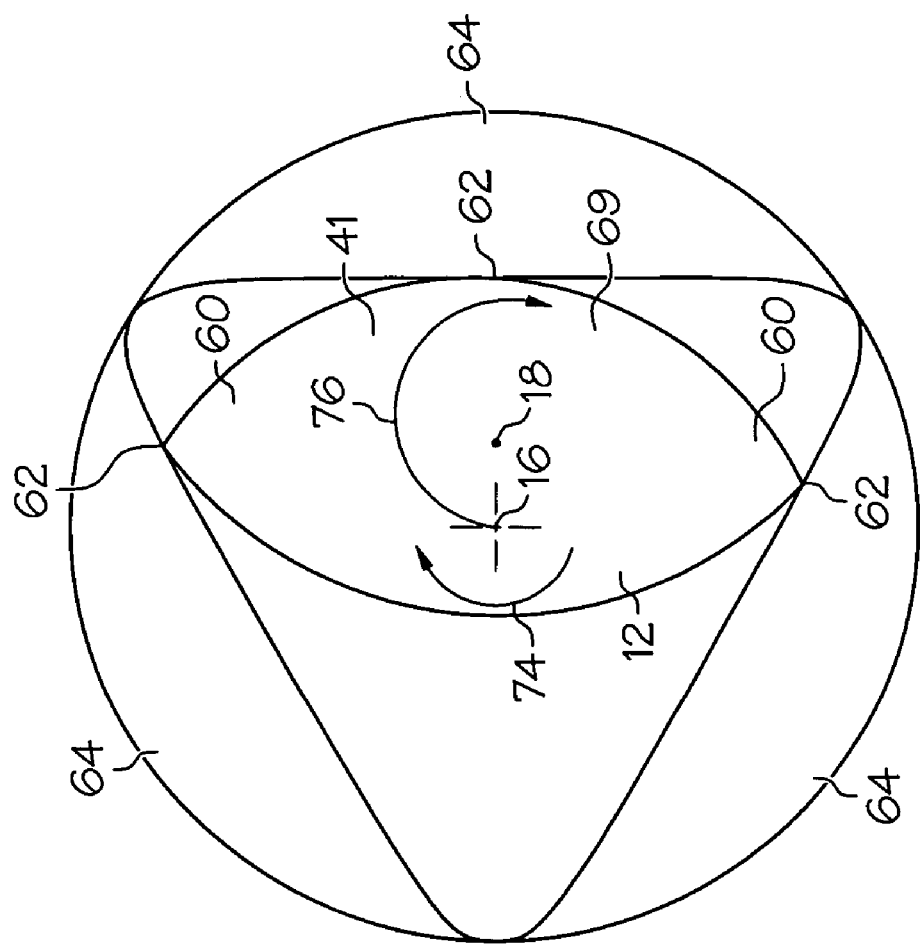
FIG. 6 is a diagrammatic cross-sectional view illustration of the inner and outer bodies taken through 6-6 in FIG. 4.
Figure 8:
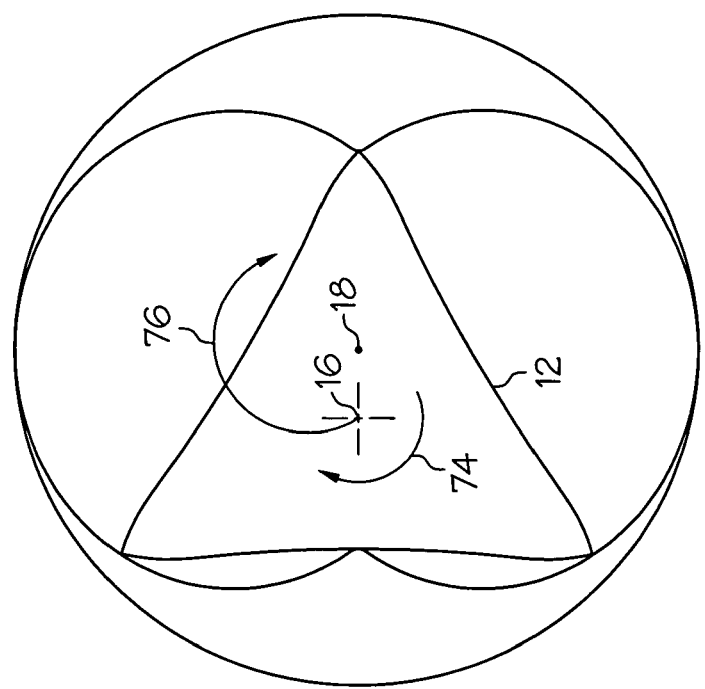
FIGS. 7-10 are diagrammatic cross-sectional view illustrations of an alternate inner and outer body configuration at different inner body relative angular positions.

Illustrated in FIG. 4 is a longitudinal cross-section taken through the inner and outer bodies 12, 14. The inner and outer bodies 12, 14 are illustrated in axial cross-section in FIG. 6. The inner body 12 is illustrated herein as having two inner body lobes 60 which correspond to two inner helical blades 17 and which results in a football or pointed oval-shaped inner body cross-section 69. The outer body 14 has three outer body lobes 64 which corresponds to three outer helical blades 27 (illustrated in FIGS. 3 and 4). Note that 3 sealing points 62 between the inner and outer bodies 12 and 14 are illustrated in FIG. 6 but that there is continuous sealing between the inner and outer helical blades 17 and 27 along the length of the inner and outer bodies 12, 14.

Figure 7:
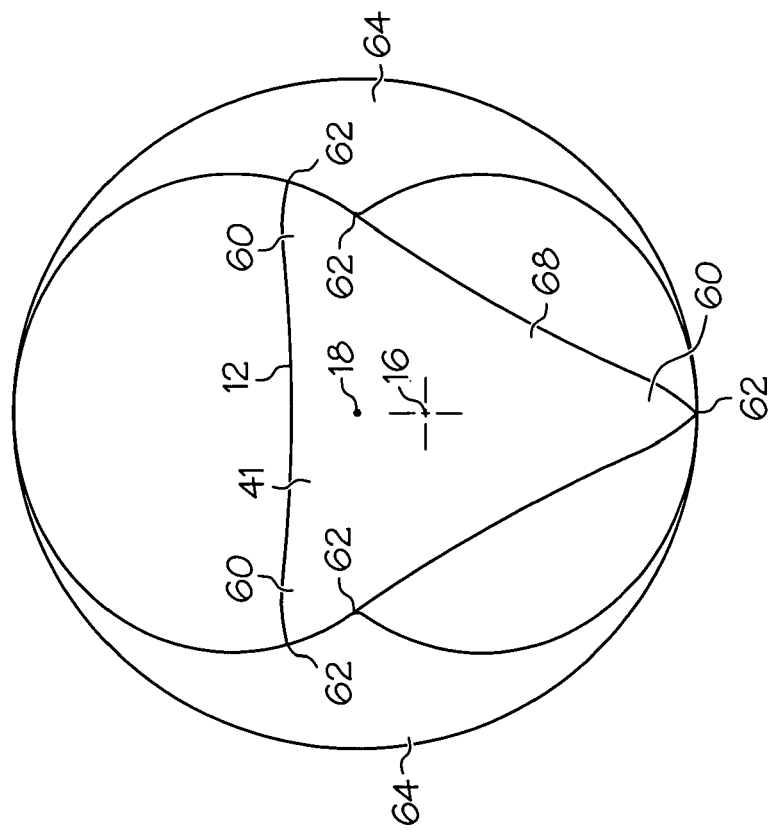
Figure 10:
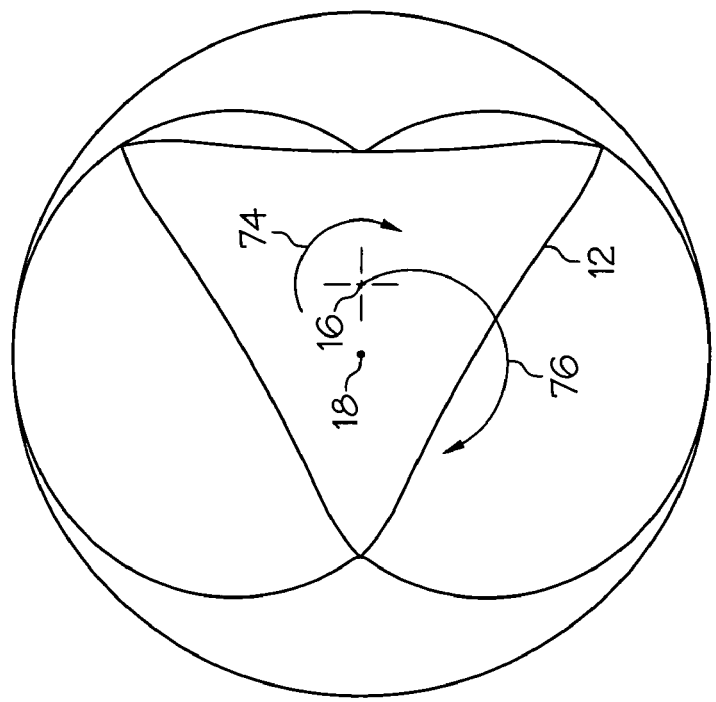
Figure 9:
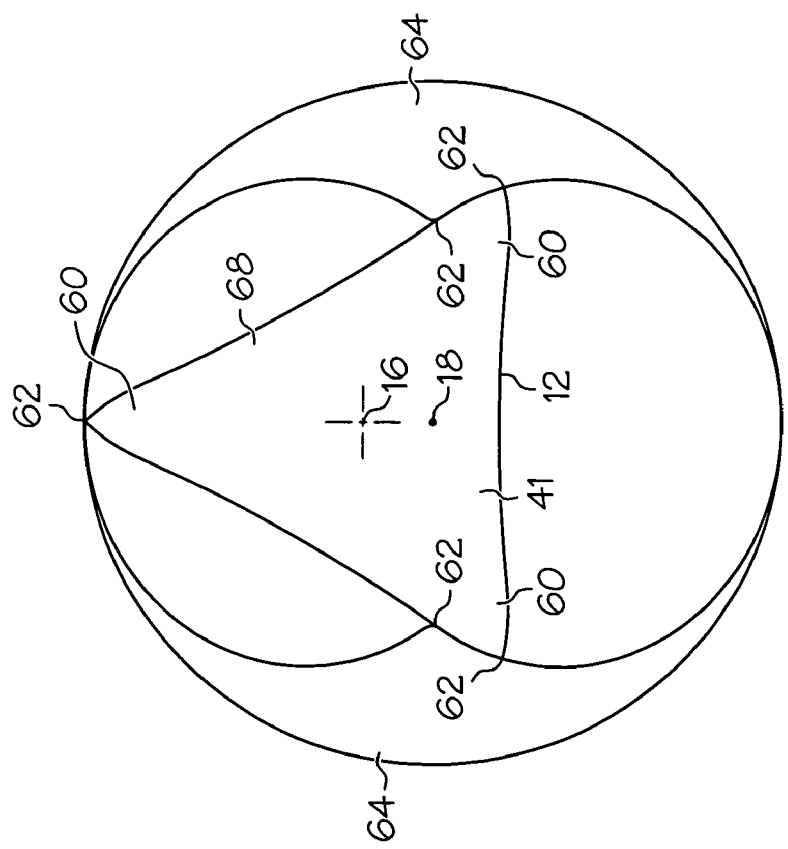

An alternative configuration of the inner and outer bodies 12, 14 is illustrated in cross-section in FIGS. 7-10. The inner body 12 is illustrated therein as having three inner body lobes 60 which correspond to three inner helical blades 17 which results in a triangularly-shaped inner body cross-section 68 as illustrated in FIG. 7. The outer body 14 has two outer body lobes 64 which corresponds to two outer helical blades 27. In general, if the inner body 12 has N number of lobes the outer body 14 will have N+1 or N−1 lobes. Note that 5 sealing points 62 between the inner and outer bodies 12 and 14 are illustrated in FIG. 7 but that there is continuous sealing between the inner and outer helical blades 17 and 27 along the length of the inner and outer bodies 12, 14.

Figure 5:
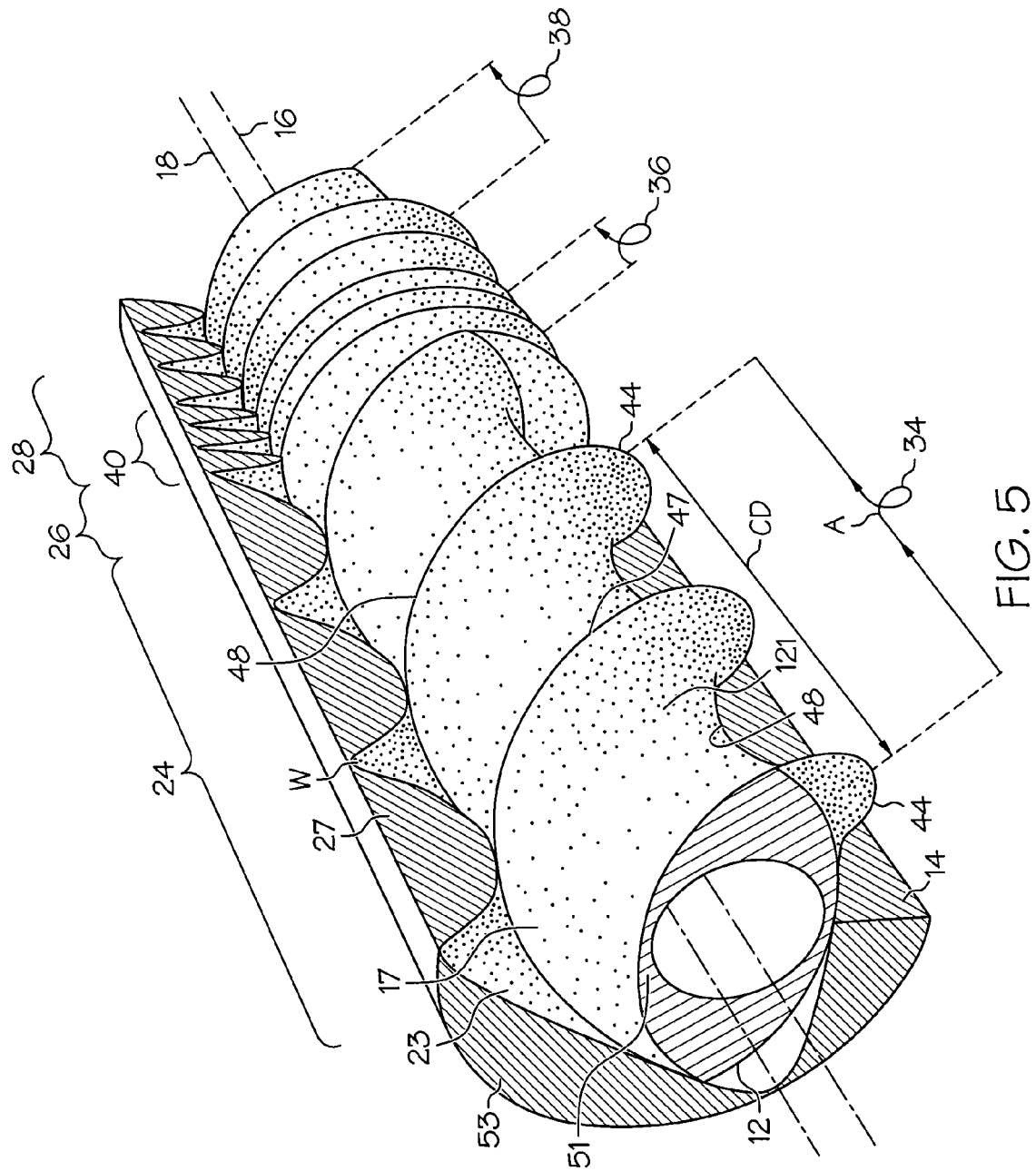
FIG. 5 is a diagrammatic cut away perspective view illustration of the helical portions of inner and outer bodies of the gas generator illustrated in FIG. 3.

Referring to FIG. 5, the helical elements have constant first, second, and third twist slopes 34, 36, 38 in the first, second, and third sections 24, 26, 28, respectively. A twist slope A is defined as the amount of rotation of a cross-section 41 of the helical element (such as the oval-shaped or triangularly-shaped inner body cross-sections 69 and 68 illustrated in FIGS. 6 and 7, respectively) per distance along an axis such as the inner axis 16 as illustrated in FIG. 5. Illustrated in FIG. 5 is 360 degrees of rotation of the inner body cross-section 41. The twist slope A is also 360 degrees or 2Pi radians divided by an axial distance CD between two adjacent crests 44 along the same inner or outer helical edges 47 and 48 of the helical element such as the inner or outer helical blades 17 or 27 as illustrated in FIG. 5. The axial distance CD is the distance of one full turn 43 of the helix.

The twist slope A of the inner element in each of the sections is different from the twist slope A of the outer element. The ratio of the twist slope A of the outer body 14 to the twist slope A of the inner body 12 is equal to the ratio of the number of inner helical blades 17 blades on the inner body 12 to the number of outer helical blades 27 blades on the outer body 14. The first twist slopes 34 are less than the second twist slopes 36 and the third twist slopes 38 are less than the second twist slopes 36. One might also describe the helical elements in terms of helical angle. The helical elements have constant first, second, and third helical angles corresponding to the constant first, second, and third twist slopes 34, 36, 38 in the first, second, and third sections 24, 26, 28, respectively, in much the same way one would describe a screw in terms of pitch and pitch angle.

Referring again to FIGS. 3-5, the inner helical blade 17 in the first section 24 has a sufficient number of turns 43 to trap the charges of air 50 in the first section 24 during the generator's operation. The trapped charges of air 50 allow positive displacement compression so that higher pressures developed downstream cannot force air or the charges back out the inlet 20. In one embodiment of the gas generator, the number of turns 43 in the first section 24 is enough to mechanically trap the charges of air 50. In another embodiment of the gas generator 10, the number of turns 43 in the first section 24 is enough to dynamically trap the charges of air 50. Mechanically trapped means that the charge 50 is trapped by being closed off from the inlet 20 at an upstream end 52 of the charge 50 before it passes into the second section 26 at a downstream end 54 of the charge 50. Dynamically trapped means that though the downstream end 54 of the trapped charge may have passed into the second section 26, the upstream end 52 of the charge has not yet completely closed. However, at its downstream end 54 by the time a pressure wave from the second section travels to the inlet 20, relative rotation between the bodies will have closed off the trapped charge of air 50 at its upstream end 52.

For the fixed outer body 14 embodiment, the inner body 12 is cranked relative to the outer axis 18 so that as it rotates about the inner axis 16, the inner axis 16 orbits about the outer axis 18 as illustrated in FIGS. 7-10. The inner body 12 is illustrated as having been rotated about the inner axis 16 from its position in FIG. 7 to its position in FIG. 8 and the inner axis 16 is illustrated as having orbited about the outer axis 18 about 90 degrees. The inner and outer bodies 12, 14 are geared together so that they always rotate relative to each other at a fixed ratio as illustrated by gearing in gearbox 82 in FIGS. 1 and 4.

If the outer body 14 in FIG. 7 was not fixed, then it would rotate about the outer axis 18 at 1.5 times the rotational speed that the inner body 12 rotates about the inner axis 16. The inner body 12 rotates about the inner axis 16 with an inner body rotational speed 74 equal to its orbital speed 76 divided by the number of inner body lobes. The number of inner lobes are equal the number of blades. If the inner body 12 rotates in the same direction as its orbital direction a 2 lobed outer body configuration is used. If the inner body 12 rotates in an opposite orbital direction a 4 lobed outer body configuration is used.

Figure 2:
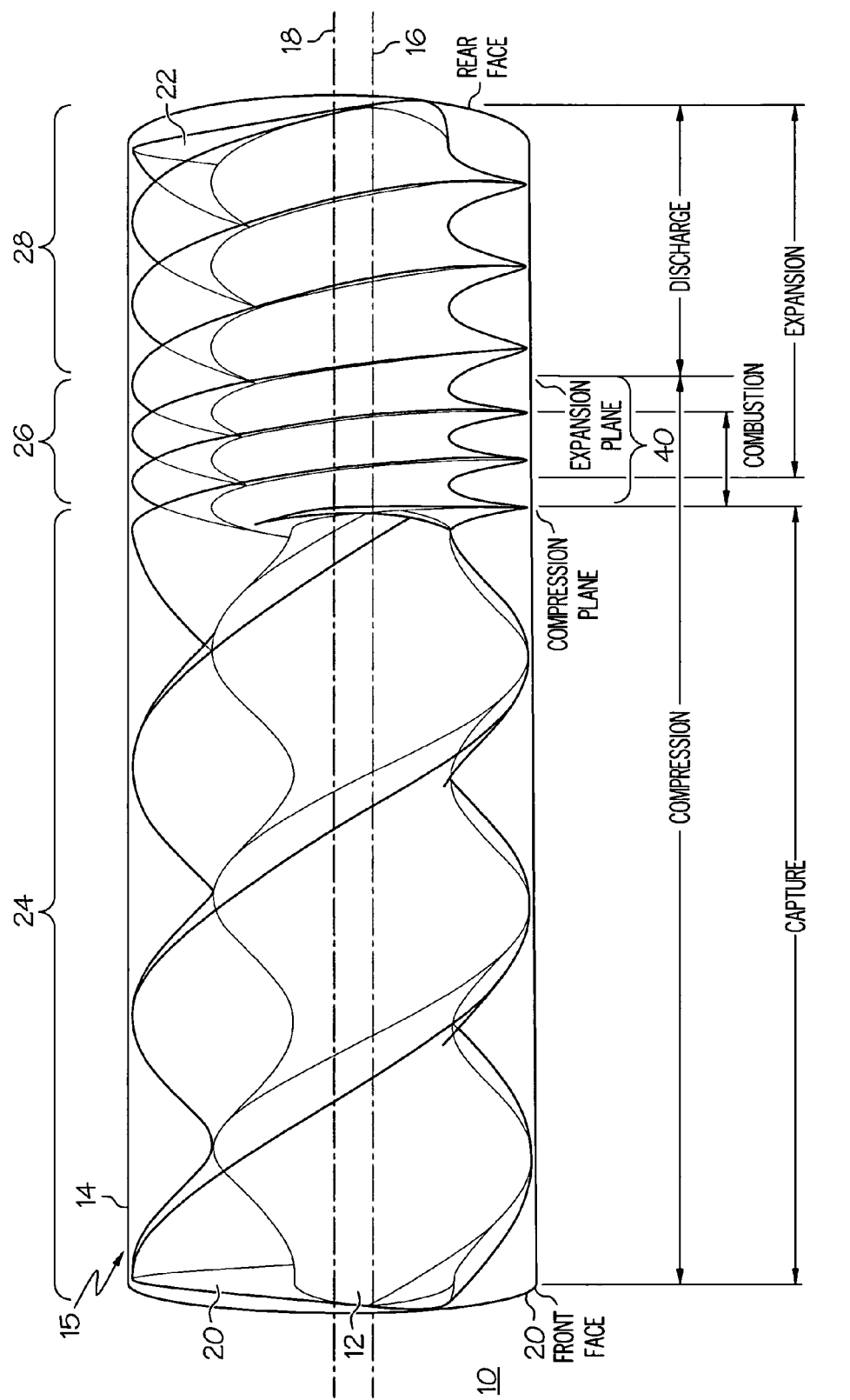
FIG. 2 is a diagrammatic cross-sectional view illustration of the positive displacement gas generator illustrated in FIG. 1.

The twist slopes of the outer body 14 are equal to the twist slopes of the inner body 12 times the number of inner body lobes N divided by the number of outer body lobes M. For the configuration illustrated in FIGS. 7-10 having three inner lobes or inner helical blades 17 and two outer lobes or outer helical blades 27, it takes 900 degrees of rotation of the outer body 14 and 600 degrees of rotation of the inner body 12 to mechanically capture one of the charges of air 50. The inner body twist slope is substantially increased going from the first section 24 to the second section 26. This axial location is designated the compression plane as indicated in FIG. 2. Combustion is initiated in the second section 26 when an upstream end of the charge of air 50 crosses the compression plane. Each of the charges is combusted individually and, because the twist slopes in the inner and outer bodies remain constant through the second section 26, there is constant volume combustion in the second section 26. A further comparison to the embodiment of the inner and outer bodies 12, 14 having two inner body lobes 60 (two inner helical blades 17) may be had by comparing FIG. 11 to FIG. 2 particularly as regards the degrees of rotation of the outer body 14 and the degrees of rotation of the inner body 12 needed to capture one of the charges of air 50 and the difference in twist slopes of the first, second, and third sections 24, 26, and 28.

Referring to FIGS. 2-4, following the constant volume combustion in the second section 26, the charge or working fluid undergoes a nearly isentropic expansion process in the third section 28 and work is extracted from the third section 28. After the leading edge of the high temperature and high pressure charge crosses the expansion plane, the volume of the charge of air 50 begins to expand and grow axially. This expansion extracts energy from the fluid, providing the work necessary to drive the first and second sections 24, 26 and sustain the gas generating process. Following expansion, the fluid is discharged across the rear plane into a downstream plenum at substantially elevated temperature and pressure relative to its initial state.

Figure 12:
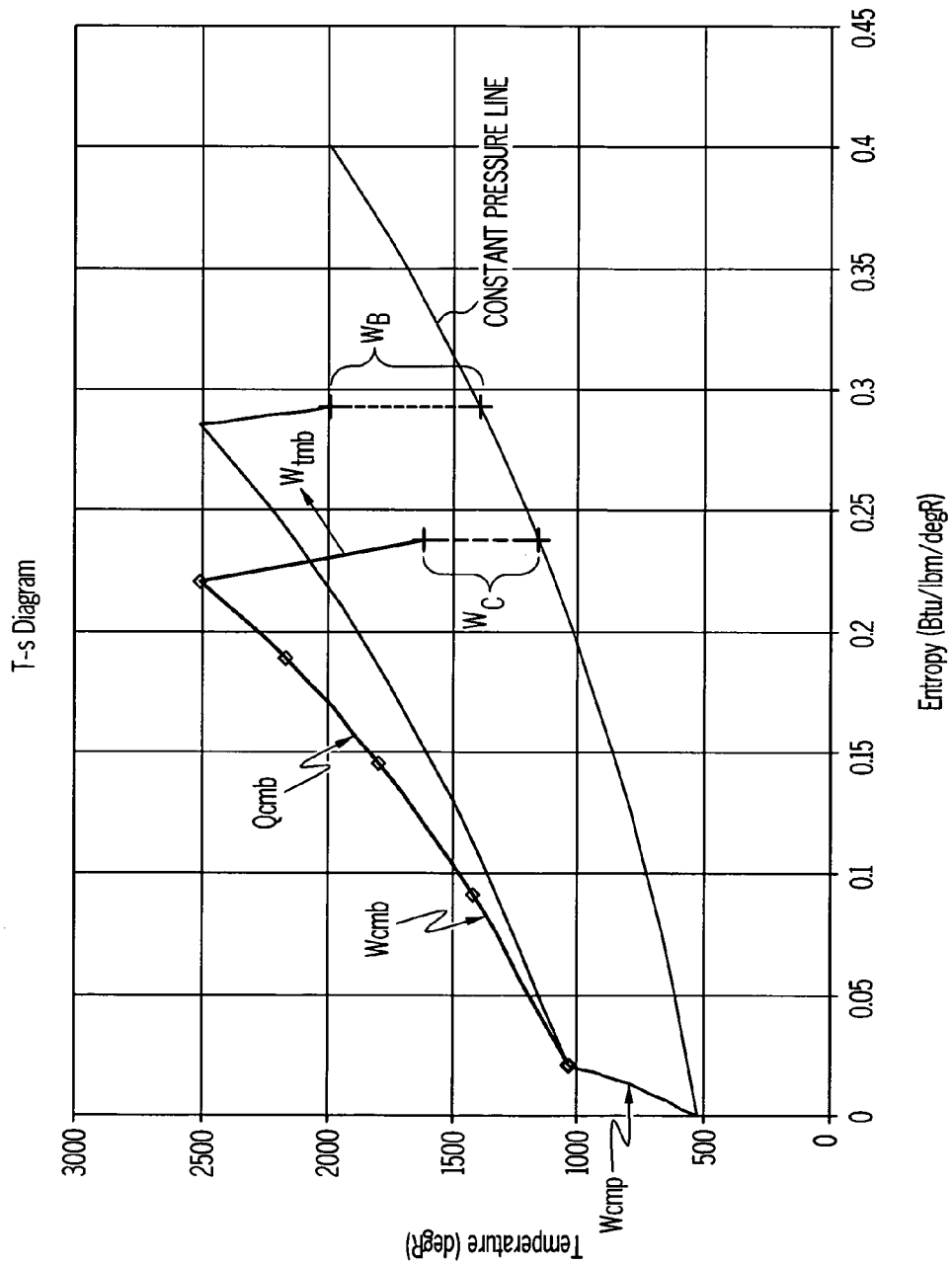
FIG. 12 is a diagrammatic view illustration of a T S temperature-entropy diagram illustrating a cycle of the gas generator illustrated in FIG. 2.

FIG. 12 illustrates a temperature-entropy diagram (T-S diagram) of a cycle of the worm engine 8 denoted as a worm core cycle versus a Brayton cycle. The worm core cycle inputs work into the compression stage of the cycle, denoted as Wcmp, for compression. The worm core cycle inputs work, denoted as Wcmb, into the constant volume combustion stage of the cycle 26 and inputs heat, denoted as Qcmb, for combustion. The worm core cycle extracts work adiabatically, denoted as Wtmb, during the expansion stage of the cycle. In the exemplary embodiment of the worm core cycle engine illustrated herein, the third section 28 functions as a turbine of the engine 8 and inputs work into both the first and second sections 24, 26.

Net work of the worm core cycle engine as illustrated in FIG. 12 is WC and the net work of the Brayton cycle is as WB. The net work of the worm cycle illustrated herein and Brayton cycles are referenced to inlet pressure of the engine 8 indicated by a constant pressure line in FIG. 12. The worm cycle illustrated herein also includes combustion through the entirety of the second section 26. This cycle for a positive displacement engine or gas generator offers substantial performance benefits over Brayton cycle engines in terms of both net work and thermal efficiency. The ability to increase net work over that of the Brayton cycle will allow the same power requirement to be met with a smaller engine or gas generator, making the combination particularly attractive for weight and size sensitive applications.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An axial flow positive displacement machine comprising: an inlet axially spaced apart and upstream from an outlet, a core assembly including an inner body disposed within an outer body and the inner and outer bodies extending from the inlet to the outlet, the inner and outer bodies having offset inner and outer axes respectively, at least one of the inner and outer bodies being rotatable about a corresponding one of the inner and outer axes, the inner and outer bodies having intermeshed inner and outer helical blades wound about the inner and outer axes respectively, the inner and outer helical blades extending radially outwardly and inwardly respectively, the inner helical blades extending radially outwardly from an inner hub of the inner body, the core assembly having first, second, and third sections in serial downstream flow relationship extending between the inlet and the outlet, the inner and outer helical blades having first, second, and third twist slopes in the first, second, and third sections respectively, the first twist slopes being less than the second twist slopes and the third twist slopes being less than the second twist slopes, and a combustor section extending axially downstream through at least a portion of the second section.

2. A machine as claimed in claim 1 further comprising the inner and outer helical blades in the first section having a sufficient number of turns to trap charges of air in the first section during the machine's operation.

3. A machine as claimed in claim 2 further comprising the number of turns being enough to mechanically trap the charges of air.

4. A machine as claimed in claim 2 further comprising the number of turns being enough to dynamically trap the charges of air.

5. A machine as claimed in claim 1 further comprising the outer body being rotatable about the outer axis and the inner body and being rotatable about the inner axis.

6. A machine as claimed in claim 4 further comprising the inner and outer bodies being geared together in a fixed gear ratio.

7. A machine as claimed in claim 6 further comprising the inner and outer helical blades in the first section having a sufficient number of turns to trap charges of air in the first section during the machine's operation.

8. A machine as claimed in claim 7 further comprising the number of turns being enough to mechanically trap the charges of air.

9. A machine as claimed in claim 7 further comprising the number of turns being enough to dynamically trap the charges of air.

10. A machine as claimed in claim 1 further comprising the outer body being rotatably fixed about the outer axis and the inner body being orbital about the outer axis.

11. A machine as claimed in claim 10 further comprising the inner and outer helical blades in the first section having a sufficient number of turns to trap charges of air in the first section during the machine's operation.

12. A machine as claimed in claim 11 further comprising the number of turns being enough to mechanically trap the charges of air.

13. A machine as claimed in claim 12 further comprising the number of turns being enough to dynamically trap the charges of air.

14. A gas turbine engine comprising: a gas generator connected in work producing relationship to a power consuming device, the gas generator including an inlet axially spaced apart and upstream from an outlet, a core assembly including an inner body disposed within an outer body and the inner and outer bodies extending from the inlet to the outlet, the inner and outer bodies having offset inner and outer axes respectively, at least one of the inner and outer bodies being rotatable about a corresponding one of the inner and outer axes, the inner and outer bodies having intermeshed inner and outer helical blades wound about the inner and outer axes respectively, the inner and outer helical blades extending radially outwardly and inwardly respectively, the inner helical blades extending radially outwardly from an inner hub of the inner body, the core assembly having first, second, and third sections in serial downstream flow relationship extending between the inlet and the outlet, the inner and outer helical blades having first, second, and third twist slopes in the first, second, and third sections respectively, the first twist slopes being less than the second twist slopes and the third twist slopes being less than the second twist slopes, and a combustor section extending axially downstream through at least a portion of the second section.

15. A machine as claimed in claim 14 further comprising the inner and outer helical blades in the first section having a sufficient number of turns to trap charges of air in the first section during the generator's operation.

16. A machine as claimed in claim 15 further comprising the number of turns being enough to mechanically trap the charges of air.

17. A machine as claimed in claim 15 further comprising the number of turns being enough to dynamically trap the charges of air.

18. A machine as claimed in claim 14 further comprising the outer body being rotatable about the outer axis and the inner body and being rotatable about the inner axis.

19. A machine as claimed in claim 15 further comprising the inner and outer bodies being geared together in a fixed gear ratio.

20. A machine as claimed in claim 19 further comprising the inner and outer helical blades in the first section having a sufficient number of turns to trap charges of air in the first section during the generator's operation.

21. A machine as claimed in claim 20 further comprising the number of turns being enough to mechanically trap the charges of air.

22. A machine as claimed in claim 20 further comprising the number of turns being enough to dynamically trap the charges of air.

23. A machine as claimed in claim 14 further comprising the outer body being rotatably fixed about the outer axis and the inner body being orbital about the outer axis.

24. A machine as claimed in claim 23 further comprising the inner and outer helical blades in the first section having a sufficient number of turns to trap charges of air in the first section during the generator's operation.

25. A machine as claimed in claim 24 further comprising the number of turns being enough to mechanically trap the charges of air.

26. A machine as claimed in claim 25 further comprising the number of turns being enough to dynamically trap the charges of air.

27. An aircraft gas turbine engine comprising: a fan section and a core engine including a gas generator downstream of the fan section, a turbine having at least one row of turbine rotor blades downstream of the gas generator, the turbine drivingly attached to at least one row of circumferentially spaced apart fan rotor blades in the fan section by a shaft, the gas generator including an inlet axially spaced apart and upstream from an outlet, a core assembly including an inner body disposed within an outer body and the inner and outer bodies extending from the inlet to the outlet, the inner and outer bodies having offset inner and outer axes respectively, at least one of the inner and outer bodies being rotatable about a corresponding one of the inner and outer axes, the inner and outer bodies having intermeshed inner and outer helical blades wound about the inner and outer axes respectively, the inner and outer helical blades extending radially outwardly and inwardly respectively, the inner helical blades extending radially outwardly from an inner hub of the inner body, the core assembly having first, second, and third sections in serial downstream flow relationship extending between the inlet and the outlet, the inner and outer helical blades having first, second, and third twist slopes in the first, second, and third sections respectively, the first twist slopes being less than the second twist slopes and the third twist slopes being less than the second twist slopes, and a combustor section extending axially downstream through at least a portion of the second section.

28. A machine as claimed in claim 27 further comprising the inner and outer helical blades in the first section having a sufficient number of turns to trap charges of air in the first section during the generator's operation.

29. A machine as claimed in claim 28 further comprising the number of turns being enough to mechanically trap the charges of air.

30. A machine as claimed in claim 28 further comprising the number of turns being enough to dynamically trap the charges of air.

31. A machine as claimed in claim 27 further comprising the outer body being rotatable about the outer axis and the inner body and being rotatable about the inner axis.

32. A machine as claimed in claim 28 further comprising the inner and outer bodies being geared together in a fixed gear ratio.

33. A machine as claimed in claim 32 further comprising the inner and outer helical blades in the first section having a sufficient number of turns to trap charges of air in the first section during the generator's operation.

34. A machine as claimed in claim 33 further comprising the number of turns being enough to mechanically trap the charges of air.

35. A machine as claimed in claim 33 further comprising the number of turns being enough to dynamically trap the charges of air.

36. A machine as claimed in claim 27 further comprising the outer body being rotatably fixed about the outer axis and the inner body being orbital about the outer axis.

37. A machine as claimed in claim 36 further comprising the inner and outer helical blades in the first section having a sufficient number of turns to trap charges of air in the first section during the generator's operation.

38. A machine as claimed in claim 37 further comprising the number of turns being enough to mechanically trap the charges of air.

39. A machine as claimed in claim 38 further comprising the number of turns being enough to dynamically trap the charges of air.

40. An aircraft gas turbine engine comprising: a fan section and a core engine including a gas generator downstream of the fan section, a turbine having at least one row of turbine rotor blades downstream of the gas generator, the turbine drivingly attached to at least one row of circumferentially spaced apart fan rotor blades in the fan section by a shaft, the gas generator including an inlet axially spaced apart and upstream from an outlet, a core assembly including an inner body disposed within an outer body and the inner and outer bodies extending from the inlet to the outlet, the inner and outer bodies having offset inner and outer axes respectively, the inner and outer bodies being rotatable about the inner and outer axes respectively, the inner and outer bodies having intermeshed inner and outer helical blades wound about the inner and outer axes respectively, the inner and outer helical blades extending radially outwardly and inwardly respectively, the inner helical blades extending radially outwardly from an inner hub of the inner body, the core assembly having first, second, and third sections in serial downstream flow relationship extending between the inlet and the outlet, the inner and outer helical blades having first, second, and third twist slopes in the first, second, and third sections respectively, the first twist slopes being less than the second twist slopes and the third twist slopes being less than the second twist slopes, and a combustor section extending axially downstream through at least a portion of the second section.

41. A machine as claimed in claim 40 further comprising the inner and outer helical blades in the first section having a sufficient number of turns to trap charges of air in the first section during the generator's operation.

42. A machine as claimed in claim 41 further comprising the number of turns being enough to mechanically trap the charges of air.

43. A machine as claimed in claim 40 further comprising the inner and outer bodies being geared together in a fixed gear ratio.

44. A machine as claimed in claim 43 further comprising the inner and outer helical blades in the first section having a sufficient number of turns to trap charges of air in the first section during the generator's operation and the number of turns being enough to mechanically trap the charges of air.

* * * * *